June 4, 1963 M. D. PAPINEAU 3,092,804
PHASE ANALYZER
Filed June 30, 1955 4 Sheets-Sheet 1
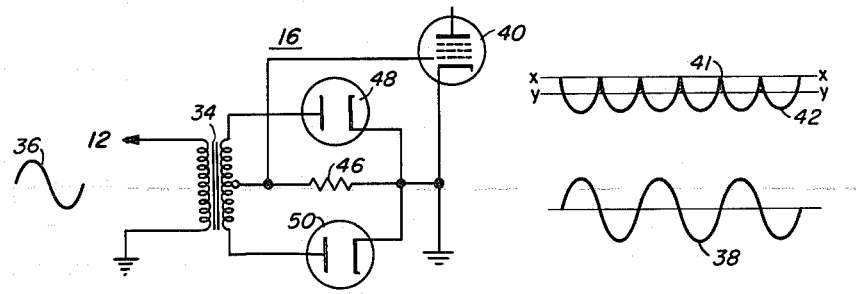
Fig. 5     Fig. 6
Fig. 1
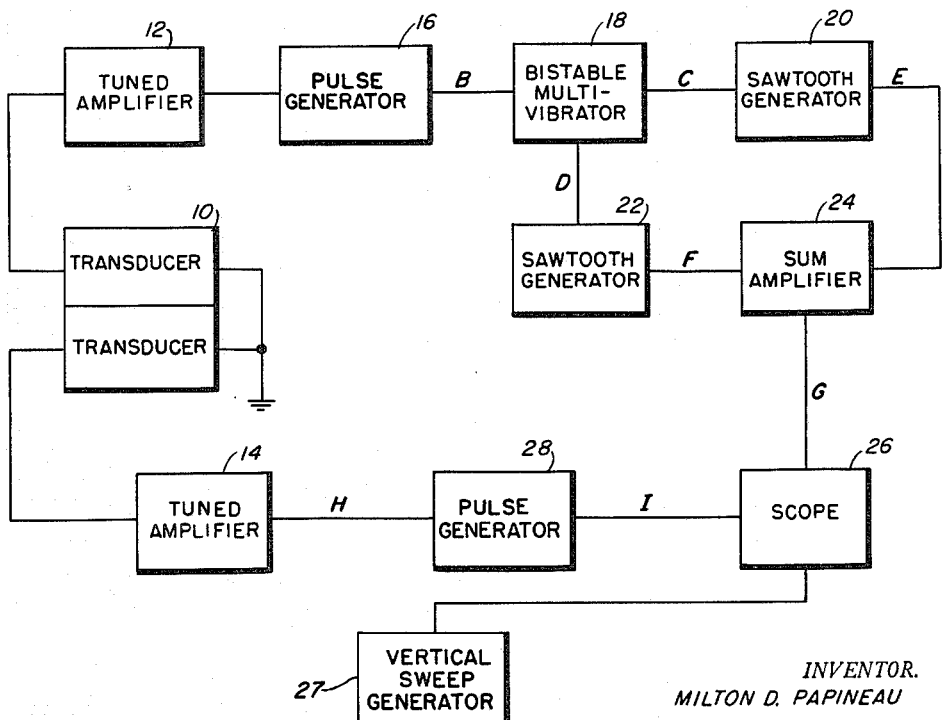
INVENTOR.
MILTON D. PAPINEAU
BY George Sipkin
ATTORNEYS

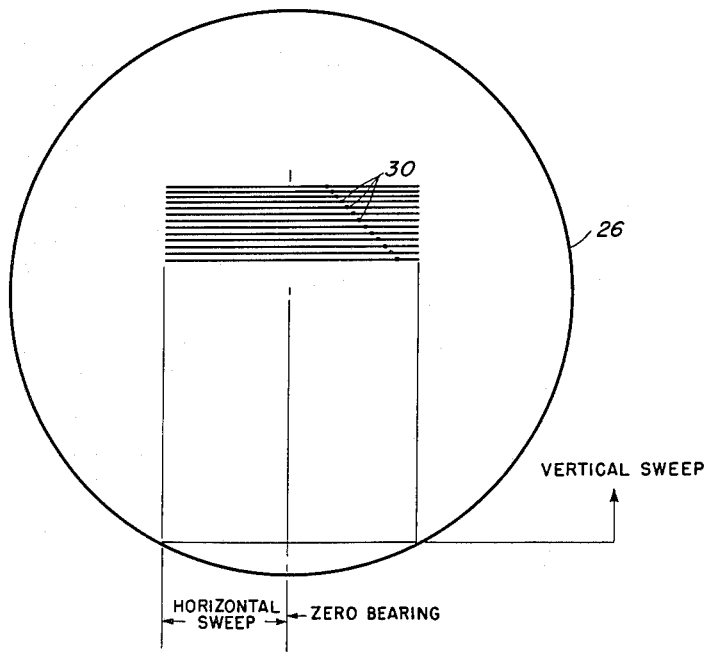
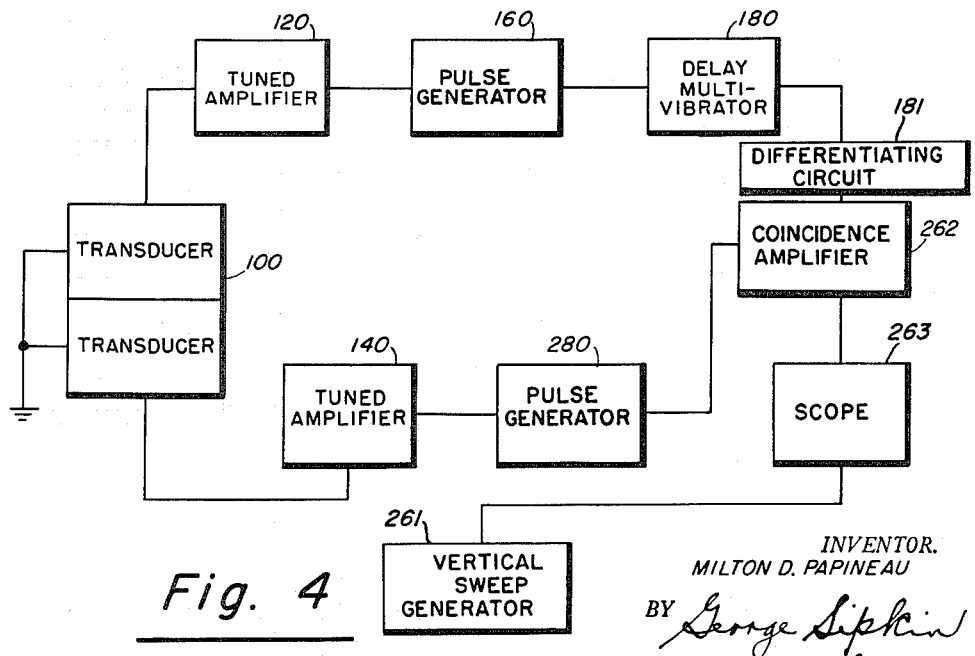

June 4, 1963　　M. D. PAPINEAU　　3,092,804
PHASE ANALYZER

Filed June 30, 1955　　4 Sheets-Sheet 3

Fig. 3

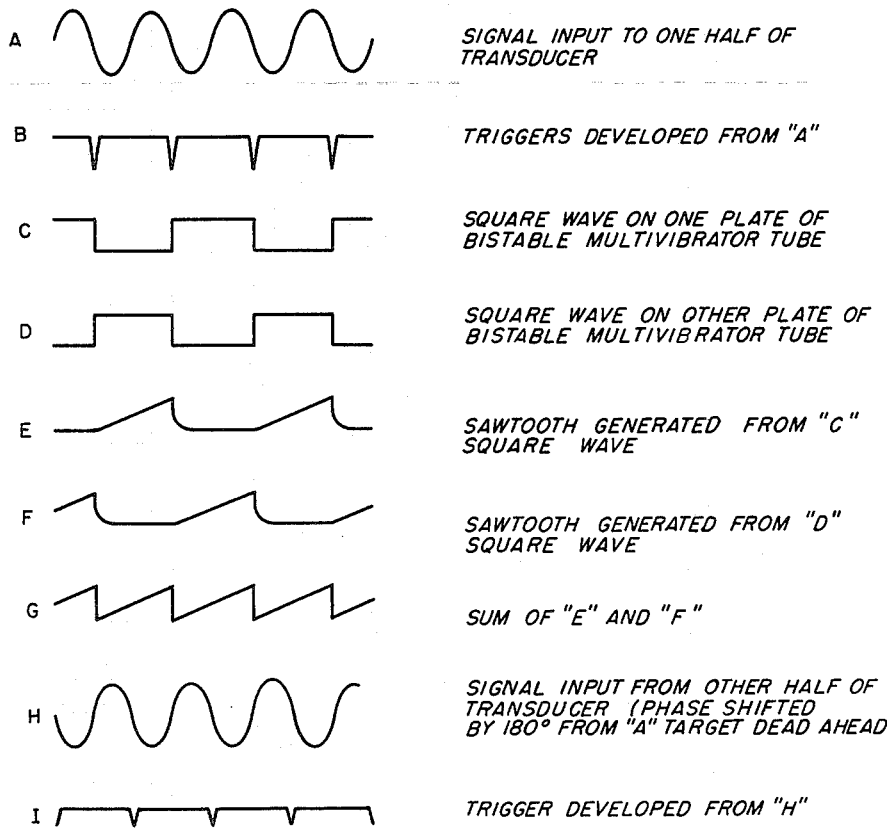

A — SIGNAL INPUT TO ONE HALF OF TRANSDUCER

B — TRIGGERS DEVELOPED FROM "A"

C — SQUARE WAVE ON ONE PLATE OF BISTABLE MULTIVIBRATOR TUBE

D — SQUARE WAVE ON OTHER PLATE OF BISTABLE MULTIVIBRATOR TUBE

E — SAWTOOTH GENERATED FROM "C" SQUARE WAVE

F — SAWTOOTH GENERATED FROM "D" SQUARE WAVE

G — SUM OF "E" AND "F"

H — SIGNAL INPUT FROM OTHER HALF OF TRANSDUCER (PHASE SHIFTED BY 180° FROM "A" TARGET DEAD AHEAD

I — TRIGGER DEVELOPED FROM "H"

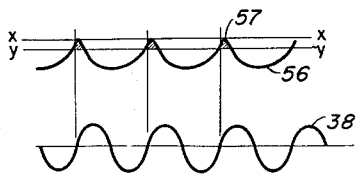

Fig. 8

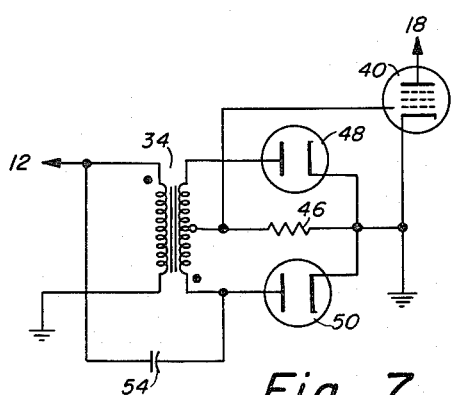

Fig. 7

INVENTOR.
MILTON D. PAPINEAU
BY George Lipkin
George E. Pearson
ATTORNEYS 3,092,804
PHASE ANALYZER
Milton D. Papineau, 2303 Cecilia Terrace,
San Diego 10, Calif.
Filed June 30, 1955, Ser. No. 519,289
5 Claims. (Cl. 340—6)
(Granted under Title 35, U.S. Code (1952), sec. 266)

The invention described herein may be manufactured and used by or for the Government of the United States of America for governmental purposes without the payment of any royalties thereon or therefor.

This invention relates to phase indicating systems and more particularly to circuitry which utilizes the phase relation between the wave fronts of energy waves respectively received by each half of a split transducer to provide bearing deviation indication.

The known orientation of a transducer which receives compressional waves will afford a relatively rough indication of the bearing of the wave source which indication becomes more accurate as the beam width of the transducer is decreased. However, there are numerous factors which limit the minimum beam width whereby known transducers will indicate reception of compressional waves from a plurality of directions within the major lobe of the beam pattern. To provide additional information concerning the direction of propagation of received waves there has been devised a bearing deviation indicator which comprises a transducer divided in two and circuitry for comparing the relative amplitudes of the signals obtained from each half. In such an arrangement the two amplitude comparing channels must be accurately matched as to gain and no cycle by cycle analysis of the received wave is possible. Furthermore, this method of amplitude comparison is merely qualitative since it provides solely a right-left indication (i.e., it indicates only that half of the beam pattern in which the line of wave propagation lies).

The bearing deviation indicator of this invention comprises a split transducer for receiving compressional wave energy and generating in response thereto a pair of electric energy signals of phase relation which varies in accordance with the direction of propagation of the received energy. Each signal is converted to a pulse train and means is provided to indicate the phase relation between corresponding pulses of the two trains whereby the cycle by cycle bearing deviation of the propagation direction is continuously and quantitatively indicated regardless of received wave amplitude or frequency.

It is an object of this invention to provide a quantitative means for indicating the direction of propagation of reflected energy relative to the receiving transducer.

A further object of this invention is to provide a bearing deviation indicator which is independent of the amplitude and frequency of received wave energy.

Another object of this invention is to provide an improved system for indicating the cycle by cycle bearing deviation of received wave energy.

Still another object of this invention is the provision of means for indicating the phase relation between periodic signals of like frequency.

A further object of this invention is the provision of means for obtaining a pulse train from periodic signal which means is independent of the signal amplitude and is responsive to a wide band of frequencies.

Still another object of this invention is the provision of means for quantitatively displaying the bearing deviation of a compressional wave energy source.

A further object of this invention is the provision of apparatus for indicating physical characteristics and orientation of a sonar target.

Other objects and many of the attendant advantages of this invention will be readily appreciated as the same becomes better understood by reference to the following detailed description when considered in connection with the accompanying drawings wherein:

FIG. 1 is a block diagram of one embodiment of the bearing deviation indicator of this invention;

FIG. 2 is a pictorial representation of a display which may appear on the face of the oscilloscope of FIG. 1;

FIG. 3 is a synchrograph of several waveforms developed in the apparatus of FIG. 1;

FIG. 4 is a block diagram of a modification of the apparatus of FIG. 1;

FIG. 5 is a schematic illustration of a sine wave pulse generator;

FIG. 6 is a synchrograph of waveforms developed in the circuit of FIG. 5;

FIG. 7 is a schematic illustration of a modification of the pulse generator of FIG. 5; and FIG. 8 is a synchrograph of waveforms developed in the circuit of FIG. 7.

Figure 9:
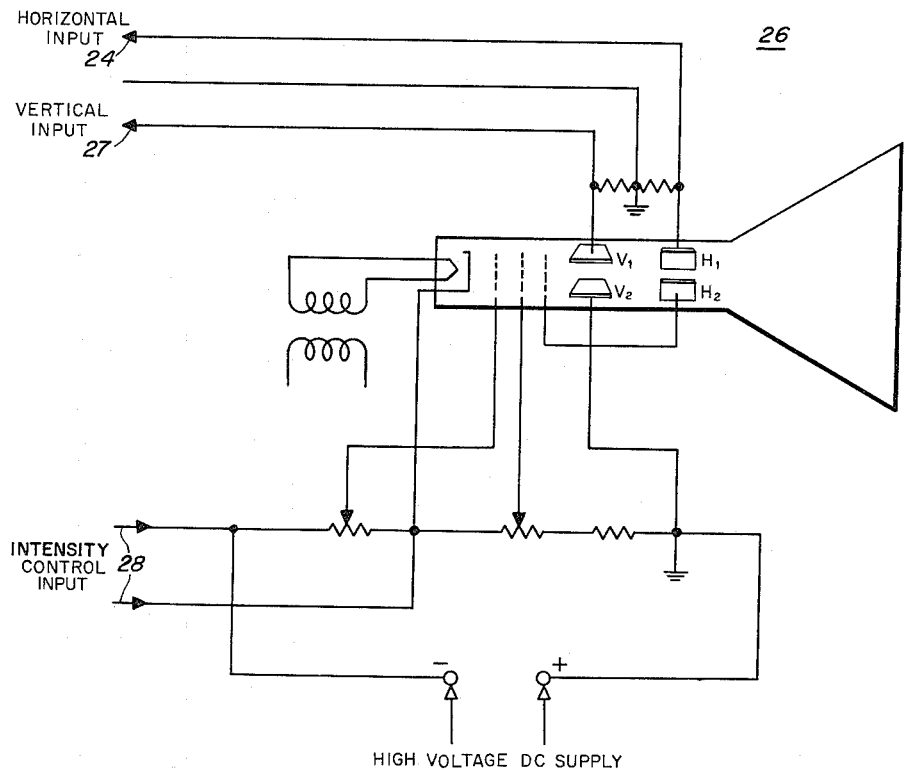
FIG. 9 is a schematic illustration of the oscilloscope circuit in FIG. 1.

The transducer 10 (FIG. 1) may be any suitable one of the known devices of this type which are adapted to convert periodic wave energy impinging thereupon into a periodic electrical energy signal of like or opposite phase. The split motor type of sonar transducer actually comprises a pair of closely adjacent but independent transducers each of which will produce a signal (independent of that produced by the other) of like or opposite phase relative to the compressional wave received thereby. The transducer shown, for example, may be of the type more particularly described in the co-pending application of L. R. Padberg, Jr., for Magnetostrictive Electro-Acoustical Transducer, Serial No. 503,842, filed April 25, 1955, now U.S. Patent No. 2,961,638, which comprises a pair of juxtaposed magnetostrictive assemblies wherein the line of division between the assemblies lies in a plane containing the central axis of projection or reception of the transducer. The windings of the two assemblies each have one end thereof coupled with the input of one of the tuned amplifiers while the other end of each winding is grounded. Reversal of the ends of either winding will reverse the polarity of the signal output thereof (i.e., effect a 180° phase shift). In the present invention the output leads of the transducer are so arranged that the signals from each half are 180° out of phase relative to each other when the transducer halves are excited in phase by received compressional wave energy.

The energy received by the transducer of an echo ranging system may be reflected from a target at which has been projected a train of pulsed sinusoidal sonic energy oscillations at a carrier frequency. Thus for each reflected pulse the signal fed to and from tuned amplifier 12 will have a waveform such as A, FIG. 3, which is of the same shape, phase and frequency as the waveform of the energy pulse received by one transducer half. Similarly the signal fed to and from tuned amplifier 14 will have a waveform such as H, FIG. 3, which is of the same shape and frequency as the waveform of the energy received by the other transducer half but is phase shifted 180° with respect to this energy wave because of the reversal of transducer leads.

The two waveforms A, H have been shown at 180° relative phase shift which is a condition that occurs when the direction of propagation of received energy is perpendicular to the receiving plane of the transducer. The phase relation between the outputs of the two transducer halves depends upon the carrier frequency of received energy, the spacing of the transducer halves and bearing deviation (i.e., the angle between the direction of propagation of received energy and the axis of the transducer beam pattern). In echo ranging apparatus both carrier frequency and transducer spacing are seldom varied during use whereby the phase relation of the two transducer outputs varies only with the bearing deviation of the target. As deviation increases or decreases the phase difference increases or decreases. It becomes apparent then that means which indicates the phase relation of signals A and H will indicate target bearing deviation.

FIG. 9 shows a conventional cathode ray oscilloscope representing block 26 of the diagram illustrated in FIG. 1. The sawtooth voltage from the sum amplifier 24 is used for the horizontal sweep of the oscilloscope 26 while the vertical sweep generator 27 deflects the vertical sweep of the oscilloscope 26. The signal from the pulse generator 28 is fed to the intensity controls of cathode ray tube 26 to provide intensity modulation of the electron beam.

The sinusoidal output of tuned amplifier 12 is fed to pulse generator 16 which produces pulse train B comprising trigger pulses, one for each cycle, recurring at the frequency of and in phase with signal A. A bistable multivibrator 18 is triggered by pulse train B to produce a pair of square waves C and D which are respectively applied to sawtooth generators 20, 22. Each sawtooth generator produces a sawtooth during the negative half cycle of the square applied thereto whereby there is provided a pair of sawtooth waveforms E, F, each of which is in phase with the signal A but occurs at one half the frequency thereof. Since waves E and F are exactly 180° out of phase relative to each other, the output of summing amplifier 24 to which both waves are fed will be the sawtooth G which is absolutely synchronized with the input signal and which recurs at the frequency of and in phase with the input signal A. The initiation of each cycle of sawtooth G substantially coincides with alternate ones of the zero cross over points of signal A (i.e., the points at which the instantaneous value of the signal amplitude is equal to the average D.-C. level thereof). Sawtooth G is applied to the horizontal deflection plates of cathode ray tube 26 whereby the electron beam thereof is caused to sweep the face of the tube screen in phase with signal A and at the frequency thereof, each sweep terminating and the next sweep commencing simultaneously at alternate ones of the zero cross over points. The width of the sweep represents the transducer pulse width.

The signal H is fed to pulse generator 28, which may be identical to pulse generator 16, to produce a pulse train I which is fed to the intensity control 29 of cathode ray tube 26 to provide Z axis illumination or intensity modulation of the electron beam. Each pulse of train I effects a momentary brightening of the beam at some point during the horizontal sweep thereof. The position of these bright spots 30 (FIG. 2) indicate the phase relation between signals A and H and, therefore, the angle of incidence of the received compressional wave energy. With a target on a line perpendicular to the plane of the transducer the bearing deviation is zero and the two halves of the transducer are excited exactly in phase. Due to reversal of the transducer leads the signals A and H will be exactly 180° out of phase and pulses I will intensity modulate the cathode ray to cause the bright spot on the tube screen to appear at the mid point of the beam sweep. A shift of the target to the right or left (change in bearing deviation) will cause the pulse train I to lag or lead pulse train B by an amount proportional to the amount of bearing deviation whereby the spot 30 will appear on the screen at a position to the right or left of the vertical centerline thereof which quantitatively indicates the bearing deviation.

The vertical deflection plates of oscilloscope 26 are fed with a sawtooth developed by a sweep generator 27 which is keyed at a suitable rate such as the pulse repetition rate of the transmitting transducer of the sonar apparatus. Thereby the beam will horizontally sweep many times (at the carrier frequency) during each vertical or range sweep and the vertical position of the spot provides an indication of the range of the reflecting source of the received compressional energy. As there is provided one horizontal sweep for each cycle of carrier frequency there is presented a cycle by cycle display of the bearing deviation of the received energy. Since different portions of a single target may have different bearing deviations and may reflect the transmitted energy to the transducer in different directions relative to the plane of the transducer, the angle of incidence of the energy received by the transducer 10 may decrease (or increase) with each succeeding cycle as indicated by the line of spots 30 in FIG. 2. This cycle by cycle shift of bearing deviation will vary with the shape and aspect of the target and thus provide an indication of both physical characteristics and orientation of the target. As the wave front of each cycle of received compressional energy angularly shifts due to target shape the bright spot of the display oscilloscope 26 will shift correspondingly.

It will readily be appreciated that the cycle by cycle display produced on oscilloscope 26 will yield information which may be utilized in classifying a target by reason of the relation between successive bright spots and the target shape and orientation. For example, the line of spots 30 illustrated in FIG. 2 would indicate that the target has reflecting bearing deviations corresponding to the horizontal distance (measured from the vertical center line of the tube screen) to corresponding spots. Thus the display of FIG. 2 would indicate a target having a reflective surface which is oriented and located relative to the transducer in the same way as a line drawn through the spots is oriented and located relative to that point on the lower end of the vertical center line of the screen from which the vertical sweep is initiated. For usable classification information the duration of the transmitted compressional wave energy pulses must be short, preferably between one and ten milliseconds.

In the embodiment illustrated in FIG. 4 elements 100, 120, 160, 140, and 280 are identical both structurally and functionally with elements 10, 12, 16, 14, and 28 respectively of FIG. 1. The pulse train output of pulse generator 160 is fed to a monostable multivibrator 180 which produces a square wave output having a full cycle for each trigger pulse applied thereto. The output of multivibrator 180 is differentiated by the differentiating circuit 181 and the differentiated wave form is fed to a coincidence amplifier 262 after clipping of the positive pulses thereof. The period of delay multivibrator 180 may be varied from zero to one cycle of the signal frequency by a calibrated selectively variable resistance or capacitor in a well known manner, as shown in Radar Systems Fundamentals, NAVSHIPS 900,017, page 273, Fig. 224. The output of pulse generator 280 which may comprise a train of negative pulses such as shown at I, FIG. 3, is also fed to the coincidence amplifier 262 which provides an output pulse only when pulses from elements 180 and 280 occur simultaneously. As in the arrangement of FIG. 1, the signals produced by the two transducer halves are 180° out of phase relative to each other when the transducer halves are excited in phase. Since the pulse train derived from one of the tranducer signals has been selectively delayed a predetermined amount by the delay multivibrator the coincidence amplifier 262 will produce an output only when the phase shift of the excitation of the other half of the transducer is equal in time to the delay introduced by the multivibrator. Thus the existence of a signal at a bearing selected by the setting of the delay time is indicated by the output of amplifier 262. This coincidence output is fed to any suitable indicator 263 which may conveniently comprise a speaker, a light, or a cathode ray tube having a range sweep which is intensity modulated by the coincidence pulse.

By making multivibrator 180 a multivibrator of the phantastron type, the period or delay time can be continuously varied by a D.-C. or low frequency voltage to provide a scanning of the transducer beam pattern.

FIG. 5 illustrates one form of pulse generator which may be used in either of the embodiments of FIGS. 1 and 4. The primary of transformer 34 is fed with the sinusoidal signal 36 produced by one half of the transducer. The corresponding signal 38 in the transformer secondary is fully rectified and appears on the grid of vacuum tube 40 as the wave 42 which varies in one direction only from the potential of the cathode connected end of resistor 46. This pulse generator is basically a full wave rectifier comprising a pair of diodes 48, 50 having their plates connected to opposite ends of the transformer secondary and their cathodes connected to each other and to a point of fixed potential, $x—x$ (FIG. 6), such as the ground connection illustrated. Across the resistor 46 which is connected between the diode cathodes and a center tap of the transformer secondary, appears the rectified signal 42 which is fed to the control grid of amplifier tube 40. The cathode of tube 40 is directly connected to the aforementioned point of fixed potential $x—x$ (which may be ground) and the tube is chosen for and operated with a grid to cathode voltage greater than a predetermined magnitude such as $y—y$ (below the level of $y—y$) which cuts off the tube. With such an arrangement the output of tube 40 will be unaffected by voltage levels below $y—y$ and the tube will pass and amplify only the shaded peaks 41. The duration of peaks 41 may be shortened and their amplitude increased by further amplification and clipping. The pulse train output of tube 40 will be independent of the amplitude envelope (above a value which cuts the tube off) of the input signal and will exactly follow the frequency thereof.

It will be noted that the peaks or trigger pulses 41 occur at the points of zero cross over and only at these points. The points of the rectified signal are always at zero or ground potential. The only time that a zero voltage can be developed on the grid is at the time of zero voltage for both ends of the transformer secondary. This occurs only at a time corresponding to the crossing of the zero potential line of the sine wave. By using an amplifier tube whose grid or time base is quite short only the portion of the rectified signal within a few volts of zero is amplified. During the rest of the cycle the tube is cut off. Because of the short grid base of tube 40 the system has no upper limit as to amplitude of input signal voltage consistent with the parts used. The lower limit depends only upon the minimum voltage required to overcome the minimum or conductive resistance of the diodes and upon the grid time base of tube 40. With the three cathodes and one end of resistor 46 grounded as shown the rectified signal developed is always negative with respect to ground. It will readily be appreciated that the ground potential to which the cathodes are held may be replaced by any other suitable level of fixed potential whereby the level $x—x$ of FIG. 6 would then be such level of fixed potential with the signal 42 varying from and at all times below such level. The points of the rectified signal or least negative peaks 41 are always at the potential $x—x$ and can occur only when both ends of the transformer secondary are at equal levels of potential. These times of equal (zero) potential occur only at the times corresponding to the times at which the instantaneous magnitude of the input signal is equal to the average D.-C. potential thereof.

The system shown in FIG. 5 will develop two pulses 41 for each cycle of the input signal and must be provided with some means to eliminate alternate trigger pulses to provide a pulse train such as B or I of FIG. 3 wherein the pulses recur at the frequency of the input signal.

One such means for halving the repetition rate of the pulse train output of the pulse generator is shown in FIG. 7 wherein all of the elements and relation of elements are identical with the structure of FIG. 5 with the exception of the addition of capacitor 54 connected between one end of the transformer primary and one end of the transformer secondary. As illustrated, capacitor 54 is connected between terminals of respective transformer windings which are of like polarity at any one time, such terminals of like polarity being indicated in FIG. 7 by the dots adjacent thereto. As indicated in FIG. 8, the effect of the capacitor is to maintain the voltage 56 across resistor 46 well below the level $x—x$ (which may be ground as shown) during periods of negative slope of the signal 38. Waveform 56, the grid to cathode voltage of tube 40, therefore, has the least negative peaks 57 occurring only at times closely adjacent alternate ones of the zero cross over points of the input signal whereby the output of the amplifier tube 40 will comprise a train of pulses occurring substantially at zero cross over points of signal 38 and recurring at the frequency thereof.

As in the circuit of FIG. 5 the peaks or pulses 57 will have a maximum amplitude at fixed potential level $x—x$ and all portions of signal 56 below a level $y—y$ are eliminated. As explained above the duration of the pulses at the plate of tube 40 may be shortened and their amplitude increased if deemed necessary.

Obviously many modifications and variations of the present invention are possible in the light of the above teachings. It is therefore to be understood that within the scope of the appended claims the invention may be practiced otherwise than as specifically described.

What is claimed is:

1. A bearing deviation indicator comprising transducer means responsive to received compressional wave energy for generating a plurality of cyclical electrical energy signals of equal amplitude but having a phase relation which varies in accordance with the direction of propagation of said compressional wave, rectifier means for developing a pulse train from each of said signals, multivibrator means response to the pulse train developed from one of said signals for producing a pair of square waves each at one half the frequency of said received compressional wave, parallel connected sawtooth generators connecting said multivibrator to a scanning amplifier for converting said pair of square waves into a single sawtooth wave of a frequency equal to the signal frequency, and indicating means responsive to the frequency output of said multivibrator means in combination with means responsive to the frequency of another of said pulse trains for indicating the phase relation between said one train and said other train to thereby indicate the direction of propagation of said received compressional energy.

2. A system of the class described comprising a split motor type transducer means for generating a pair of electrical sinusoidal signals corresponding to the input signals respectively received by each half of the transducer, trigger amplifier means for deriving trigger pulse trains individual to said pair of electrical signals including means for producing the trigger pulse at the zero crossover points of said sinusoidal signal, said transducer means including means whereby said trigger pulse trains are 180° out of phase when said input signals are in phase, a monostable multivibrator whose period is variable from zero to the cyclic time of the frequency of said input signals and arranged to be triggered by one of said pulse trains for deriving a square wave, means for differentiating said square wave to produce a delayed trigger pulse train therefrom, a coincidence circuit having said delayed trigger pulse train and the other of said trigger pulse trains applied thereto for selecting and combining those input signals received by one transducer half whose phase shift relative to the signals received by the other transducer half is equal in time to the time delay of the multivibrator and means responsive to a preselected frequency for indicating the phase shift in trigger pulses from the input signal through the split transducer whereby input signals at various bearings can be indicated without training the transducer means by varying the period of the multivibrator.

3. A system for displaying the angular displacement of a sonar target comprising split transducer means for generating in each half thereof a sinusoidal electrical signal corresponding to the input sonar signal received thereby, a pulse generator for each said electrical signal for deriving trigger pulse trains therefrom, means for limiting the occurrence of said trigger pulse to the zero crossover points thereof, means for connecting said transducer halves whereby said trigger pulse trains respectively individual to the halves of the transducer means are 180° out of phase when the corresponding input sonar signals are in phase, a bistable multivibrator controlled by one of said trigger pulse trains for developing a dual square wave output whose frequency is one-half the frequency of the input signals and which are 180° out of phase with respect to each other, a pair of sawtooth generators controlled respectively by said two multivibrator outputs for developing sawtooths only on the negative halves of the square waves individual thereto, amplifier means for adding said sawtooths to provide one combined sawtooth per cycle of said frequency of the input signals whereby the ending of one combined sawtooth and the beginning of the next successive one coincides with said zero crossover points of the input signals, a display oscilloscope having a horizontal sweep controlled by said combined sawtooth, a vertical sweep sawtooth generator adapted to sweep at a repetition rate of said trigger pulses, and means for indicating the phase relation between said pulse trains to thereby indicate the bearing deviation of said propagated wave energy comprising a cathode ray tube having horizontal and vertical beam deflection controls and intensity controls, means for coupling said horizontal deflection control to said first trigger means, means for coupling said vertical beam deflection control to said vertical sweep generator, and means for coupling said intensity control to said second trigger means.

4. The apparatus of claim 3 wherein the pulse generator for controlling said bistable multivibrator comprises a transformer, a pair of diodes having the plates thereof respectively coupled to opposite ends of the transformer secondary and the cathodes thereof connected with each other, a resistor connected between the center of said secondary and said cathodes, and an electron tube having its control grid and cathode respectively connected to opposite ends of said resistor.

5. The apparatus of claim 4 wherein the pulse generator for controlling the second trigger pulse train comprises a transformer, a pair of diodes having the plates thereof respectively coupled to opposite ends of the transformer secondary and the cathodes thereof connected with each other, a resistor connected between the center of said secondary and said cathodes, and an electron tube having its control grid and cathode respectively connected to opposite ends of said resistor, and a capacitor connected between the terminals of respective transformer windings of like polarity.

References Cited in the file of this patent
UNITED STATES PATENTS

| | | |
|---|---|---|
| 1,564,303 | Wold | Dec. 8, 1925 |
| 2,166,991 | Guanella | July 25, 1939 |
| 2,434,644 | Fairweather | Jan. 20, 1948 |
| 2,524,180 | Schuck | Oct. 3, 1950 |
| 2,530,631 | Rich | Nov. 21, 1950 |
| 2,535,255 | Barnes | Dec. 26, 1950 |
| 2,684,474 | Kass | July 20, 1954 |